US008774789B2

(12) United States Patent  
Su et al.

(10) Patent No.: US 8,774,789 B2  
(45) Date of Patent: Jul. 8, 2014

(54) ENHANCED DISCONTINUOUS MODE OPERATION WITH SHARED RADIO FREQUENCY RESOURCES

(71) Applicant: Broadcom Corporation, Irvine, CA (US)

(72) Inventors: Jin-Sheng Su, San Diego, CA (US); Jacobus C. Alberts, Hillcrest, CA (US); Rami Mehlo, San Diego, CA (US); Vivek Ramaprasad, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/080,300

(22) Filed: Nov. 14, 2013

(65) Prior Publication Data

US 2014/0073312 A1 Mar. 13, 2014

Related U.S. Application Data

(63) Continuation of application No. 13/453,841, filed on Apr. 23, 2012, now Pat. No. 8,615,227.

(60) Provisional application No. 61/569,621, filed on Dec. 12, 2011, provisional application No. 61/587,521, filed on Jan. 17, 2012, provisional application No. 61/595,546, filed on Feb. 6, 2012.

(51) Int. Cl.  
*H04M 3/00* (2006.01)

(52) U.S. Cl.  
USPC .......... 455/419; 455/418; 455/558; 455/523; 455/525

(58) Field of Classification Search  
CPC .... H04W 8/245; H04W 88/02; H04B 1/3816; H04M 2250/14  
USPC ........................ 455/419, 418, 558, 423, 425  
See application file for complete search history.

(56) References Cited

U.S. PATENT DOCUMENTS

| 2001/0034246 A1* | 10/2001 | Hutchison et al. ............ 455/557 |
| 2008/0293426 A1 | 11/2008 | Kim et al. |
| 2010/0197316 A1 | 8/2010 | Aoyama et al. |
| 2012/0135715 A1* | 5/2012 | Kang et al. ................. 455/412.1 |

FOREIGN PATENT DOCUMENTS

| WO | WO 2009/119477 | 1/2009 |
| WO | WO 2011/056252 | 5/2011 |

OTHER PUBLICATIONS

3rd Generation Partnership Project; Technical Specification Group Radio Access Network; Physical layer procedures (FDD), (Release 9), 3GPP TS 25.214 V9.5.0 (Mar. 2011), Technical Specification, Mar. 2011, 99 pages.

3GPP, Overview of 3GPP Release 7 V0.9.16 (Jan. 2012), Jan. 2012, 171 pages.

(Continued)

*Primary Examiner* — Nghi H Ly  
(74) *Attorney, Agent, or Firm* — Brinks Gilson & Lione (57) ABSTRACT

A scheduling technique is described for discontinuous transmission and reception. The scheduling technique may be implemented in a mobile communication device with multiple SIMs. The scheduling technique facilitates enhanced communication capability for the mobile communication device. In one implementation, the scheduling technique helps avoid substantial overlap between discontinuous receive cycles of the SIMs, for example by renegotiating a discontinuous transmit/receive offset if too much overlap exists. The renegotiation process may be incorporated into a future industry standard communication protocol (e.g., 3GPP release 11 or later), or may be implemented as an extension to an existing communication protocol.

20 Claims, 11 Drawing Sheets

(56) References Cited

OTHER PUBLICATIONS

3GPP, Overview of 3GPP Release 8 V0.2.5 (Jan 2012, Jan. 2012, 246 pages.
3GPP TX 25.331 V9.6.0, $3^{rd}$ Generation Partnership Project; Technical Specification Group Radio Access Network; Radio Resource Control (RRC): Protocol Specification (Release 9), Sections 10.3.6.34a (DTS-DRX Information) and 10.3.634b (DTX-DRX Timing Information), Mar. 2011, 5 pages.

Vinella, D., et al., Discontinuous Reception and Transmission (DRX/DTX) Strategies in Long Term Evolution (LTE) for Voice-Over-IP (VOIP) Traffic Under Both Full-Dynamic and Semi-Persistent Packet Scheduling Policies, Project Group 996, Nov. 20, 2009, 123 pages.
European Search Report, App. No. 12006267.4-1854, dated Apr. 25, 2013, 5 pages.
Espacenet Bibliographic Data, Communication system, Base Station Device, and Mobile Station Device, English language abstract of WO 2009/119477 (A1), printed May 28, 2013, 2 pages.

* cited by examiner

ENHANCED DISCONTINUOUS MODE OPERATION WITH SHARED RADIO FREQUENCY RESOURCES

PRIORITY CLAIM

This application is a continuation of U.S. application Ser. No. 13/453,841 filed Apr. 23, 2012, which claims the benefit of priority to the following U.S. provisional patent applications:
U.S. Patent Application No. 61/569,621, filed Dec. 12, 2011;
U.S. Patent Application No. 61/587,521, filed Jan. 17, 2012; and
U.S. Patent Application No. 61/595,546, filed Feb. 6, 2012.

TECHNICAL FIELD

This disclosure relates to communication devices with multiple Subscriber Identity Modules (SIMs). The disclosure also relates to enhanced discontinuous transmit and receive mode operation when radio frequency resources are shared between SIMs.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Relatively recently, cellular phone manufactures have introduced phone designs that include multiple SIM cards. Each SIM card facilitates a separate connection to the same network or different networks. As a result, the SIMs provide the owner of the phone with, for example, two different phone numbers handled by the same phone hardware. Accordingly, the multiple SIM approach alleviates to some degree the need to carry different physical phones, and improvements in multiple SIM communication devices will continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to user equipment. User equipment may take many different forms and have many different functions. As one example, user equipment may be a cellular phone capable of making and receiving wireless phone calls. The user equipment may also be a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion below addresses how to manage discontinuous mode reception and transmission in user equipment that includes multiple (e.g., two) SIMs.

Figure 1:
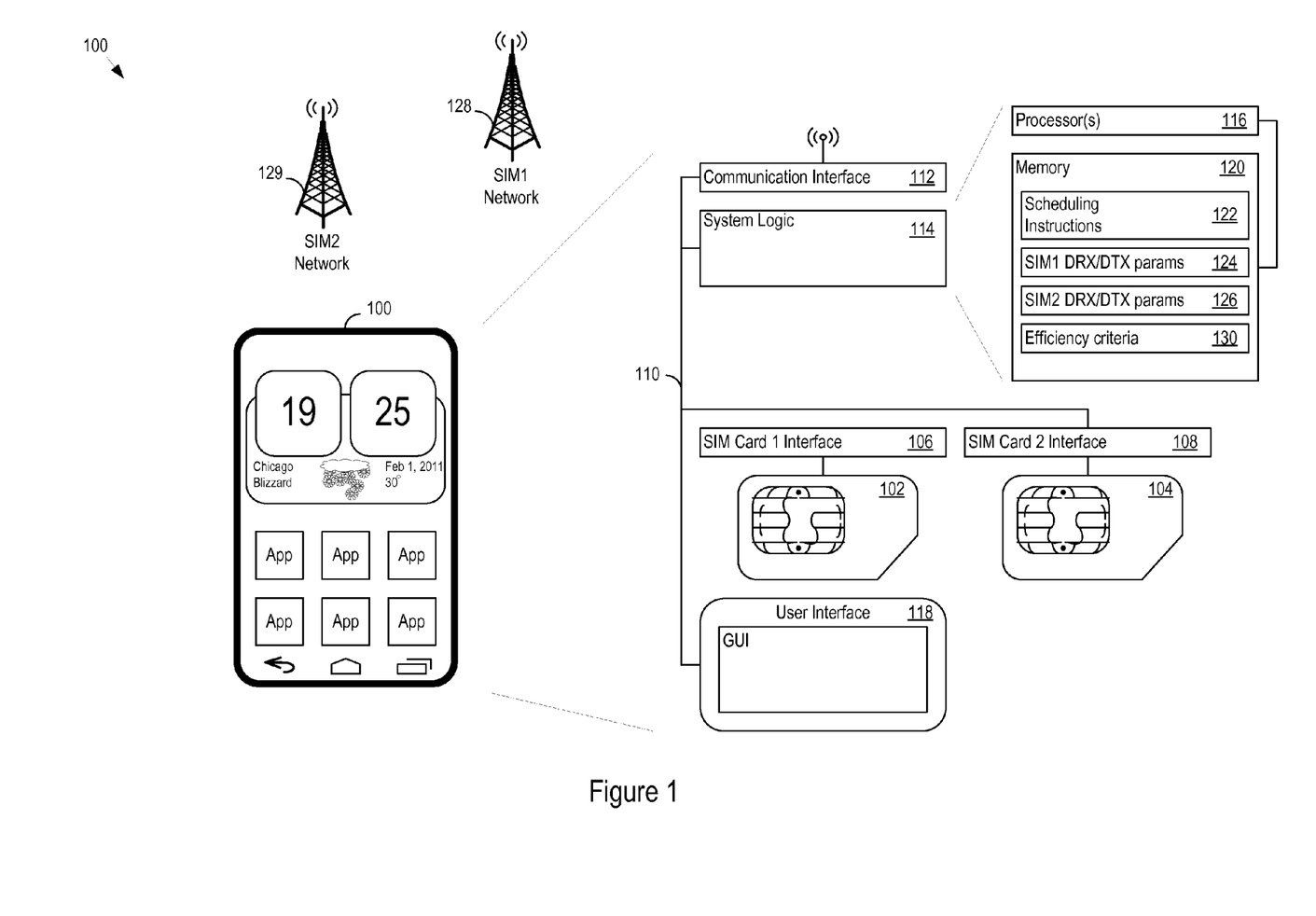
FIG. 1 shows an example of user equipment with multiple SIMs.

FIG. 1 shows an example of user equipment 100 with multiple SIMs, in this example the SIM1 102 and the SIM2 104. An electrical and physical interface 106 connects SIM1 102 to the rest of the user equipment hardware, for example, to the system bus 110. Similarly, the electrical and physical interface 108 connects the SIM2 to the system bus 110.

The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the user equipment 100. In that regard, the system logic 114 may include logic that facilitates, as examples, running applications, accepting user inputs, saving and retrieving application data, establishing, maintaining, and terminating cellular phone calls, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, amplifiers, phase locked loops (PLLs), clock generators, analog to digital and digital to analog converters and/or other logic for transmitting and receiving through one or more antennas, or through a physical (e.g., wireline) medium. The transmitted and received signals may adhere to any of a diverse array of formats, protocols, modulations, frequency channels, bit rates, and encodings. As one specific example, the communication interface 112 may support transmission and reception under the Universal Mobile Telecommunications System (UMTS). The techniques described below, however, are applicable to other communications technologies regardless of whether they arise from the 3rd Generation Partnership Project (3GPP), GSM (R) Association, Long Term Evolution (LTE) (TM) efforts, or other partnerships or other standards bodies.

Existing communication standards define a discontinuous receive mode (DRX) and a discontinuous transmit mode (DTX) for the user equipment 100. One goal of DRX/DTX is to extend battery life by not constantly receiving or transmitting on, for example, the radio resource control channels during the entire time that the user equipment 100 is assigned the radio resource. Instead, the user equipment 100 may regularly enter power saving states that significantly reduce power consumption of the user equipment 100. In the power saving states, the radio frequency (RF) modems and other system logic consume significantly less power.

The DTX/DRX modes are particularly beneficial when the user equipment 100 has relatively low activity on the radio frequency (RF) channel that may result because the user equipment 100 is carrying out functions that only infrequently send or receive data. As a specific example of DTX, the user equipment 100 may enter a power saving mode during the sometimes frequent periods of silence in a voice conversation. DRX is also beneficial when a particular SIM is not in connected mode. Specifically, instead of the disconnected SIM waking up to listen for pages for the entire duration of the entire paging channel, the SIM may only wake and receive its assigned subchannels in the paging channel to determine if the SIM is being paged. In between the assigned subchannels, the user equipment 100 may be able to enter a power saving mode.

In one implementation, the system logic 114 includes one or more processors 116 and a memory 120. The memory 120 stores, for example, scheduling instructions 122 that the processor 114 executes. SIM1 102 and SIM2 104 may be on the same or different networks, and may be served by the same or different cells. For example, the Node B 128 may manage a particular cell to which SIM1 102 is connected, while the Node B 129 may manage a different cell to which SIM2 104 is connected. Accordingly, the DTX/DRX modes may be established for each of SIM1 and SIM2 independently. The user equipment 100 may stores a set of DTX/DRX parameters for each of the SIMs in the memory 120 as the SIM1 DRX/DTX parameters 124 and the SIM2 DRX/DTX parameters 126. The Node Bs 128 and 129 (e.g., UMTS network base stations) can signal the DTX/DRX parameters to the user equipment 100 through Information Elements in a control channel, for example. As mentioned above, the Node B 128 may be part of a network that supports SIM1 102, while the Node B 129 may be part of the same or different network that supports SIM2 104. As will be described in more detail below, the system logic 114 will try to reduce inefficient DTX/DRX overlap between SIM1 102 and SIM2 104. Such inefficiencies sometimes result because the different networks that assign the DTX/DRX parameters typically do not coordinate between themselves when assigning the parameters.

Examples of the DRX/DTX parameters 124 and 126 include DRX/DTX offset, DRX/DTX cycle information, and other parameters such as those shown in sections 10.3.6.34a "DTX-DRX information" and 10.3.6.34b "DTX-DRX timing information", in the 3GPP V9.6.0 Radio Resource Control (RRC) Protocol specification, and further explained in section 6C "Discontinuous transmission and reception procedures" in the 3GPP V9.5.0 Physical Layer Procedures (FDD) document. Before turning to the scheduling techniques in detail, a short summary of the DTX/DRX parameters are given next in Table 1 with accompanying explanation. Below, E-DCH is a reference to an Enhanced Dedicated Channel, while TTI is a reference to Transmission Time Interval, a UMTS parameter that specifies duration for encapsulating data from higher layers into frames for transmission on the radio interface, as examples, frames of length 2 ms, 10 ms, 20 ms, 40 ms, or 80 ms.

Examples of DTX/DRX Parameters

TABLE 1 exemplary DTX/DRX parameters

| Information Element/Group name | Type and reference |
|---|---|
| DTX Information | |
| >CHOICE E-DCH TTI length | |
| >>10 ms | |
| >>>UE DTX cycle 1 | Enumerated (1, 5, 10, 20) subframes |
| >>>UE DTX cycle 2 | Enumerated (5, 10, 20, 40, 80, 160) |
| >>>MAC DTX cycle | Enumerated (5, 10, 20) subframes |
| >>2 ms | |
| >>>UE DTX cycle 1 | Enumerated (1, 4, 5, 8, 10, 16, 20) subframes |
| >>>UE DTX cycle 2 | Enumerated (4, 5, 8, 10, 16, 20, 32, 40, 64, 80, 128, 160) subframes |
| >>>MAC DTX cycle | Enumerated (1, 4, 5, 8, 10, 16, 20) subframes |
| >Inactivity Threshold for UE DTX cycle 2 | Enumerated (1, 4, 8, 16, 32, 64, 128, 256) E-DCH TTIs |
| >Default SG in DTX Cycle 2 | Integer (0 . . . 37, 38) Serving Grant value to be used at the transition in DTX-Cycle-2. (0 . . . 37) indicates E-DCH serving grant index as defined in [15]; index 38 means zero grant. |
| >UE DTX long preamble length | Enumerated (4, 15) slots |
| >MAC Inactivity Threshold | Enumerated (1, 2, 4, 8, 16, 32, 64, 128, 256, 512, Infinity) E-DCH TTIs |
| >CQI DTX Timer | Enumerated (0, 1, 2, 4, 8, 16, 32, 64, 128, 256, 512, Infinity) subframes |

TABLE 1-continued exemplary DTX/DRX parameters

| Information Element/Group name | Type and reference |
|---|---|
| >UE DPCCH burst_1 | Enumerated (1, 2, 5) subframes |
| >UE DPCCH burst_2 | Enumerated (1, 2, 5) subframes |
| DRX Information | |
| >UE DRX cycle | Enumerated (4, 5, 8, 10, 16, 20) subframes |
| >Inactivity Threshold for UE DRX cycle | Enumerated (0, 1, 2, 4, 8, 16, 32, 64, 128, 256, 512) subframes |
| >Inactivity Threshold for UE Grant Monitoring | Enumerated (0, 1, 2, 4, 8, 16, 32, 64, 128, 256) E-DCH TTIs |
| >UE DRX Grant Monitoring | Boolean |
| Uplink DPCCH slot format information | Enumerated (1, 4) |
| | Slot format # to be used on UL DPCCH. |
| Information Element/Group name | Type and reference |
| CHOICE timing | |
| >Continue | (no data) |
| >New timing | |
| >>Enabling Delay | Enumerated (0, 1, 2, 4, 8, 16, 32, 64, 128) radio frames |
| >>UE DTX DRX Offset | Integer (0 to 159) subframes. Offset of the DTX and DRX cycles at the given TTI. |

Regarding the parameters in Table 1, for discontinuous transmission, e.g., discontinuous uplink (UL) Dedicated Physical Control Channel (DPCCH) transmission:

CQI_DTX_TIMER: Specifies the number of subframes during which the Channel Quality Indicator (CQI) reports have higher priority than the DTX pattern. This is the initial value of CQI nominal reporting timer.

UE_DTX_cycle_1: Specifies the UL DPCCH burst pattern length in subframes.

UE_DTX_cycle_2: Specifies the UL DPCCH burst pattern length in subframes.

Inactivity_Threshold_for_UE_DTX_cycle_2: Defines a number of consecutive E-DCH TTIs without an E-DCH transmission, after which the user equipment 100 moves from UE_DTX_cycle_1 to using UE_DTX_cycle_2.

UE_DPCCH_burst_1: Determines the Uplink DPCCH burst length in subframes, when UE_DTX_cycle_1 is applied.

UE_DPCCH_burst_2: Determines the Uplink DPCCH burst length in subframes, when UE_DTX_cycle_2 is applied.

UE_DTX_long_preamble_length: Determines in slots the length of the preamble associated with the UE_DTX_cycle_2.

For both discontinuous UL DPCCH transmission and discontinuous downlink reception:

UE_DTX_DRX Offset: Determines the UL DPCCH burst pattern and HS-SCCH reception pattern offset in subframes.

Enabling_Delay: ensures that the uplink DPCCH and downlink F-DPCH are transmitted continuously for Enabling_Delay radio frames after DTX_DRX_STATUS is set to TRUE or ensures that, with DTX_DRX_STATUS set to TRUE, the uplink DPCCH on the secondary uplink frequency is transmitted continuously for Enabling_Delay radio frames after application of secondary uplink frequency activation.

For discontinuous downlink reception:

UE_DRX cycle: Determines the HS-SCCH reception pattern length in subframes.

Inactivity_Threshold_for_UE_DRX_cycle: Defines the number of subframes after an HS-SCCH reception or after the first slot of an HS-PDSCH reception during which the user equipment 100 monitors the HS-SCCHs in the user equipment's HS-SCCH set with the exceptions of N_acknack_transmit>1 or InterTTI>1.

UE_DRX_Grant_Monitoring: A Boolean which determines whether the user equipment is required to monitor the E-AGCH transmissions from the serving E-DCH cell and the E-RGCH from cells in the serving E-DCH radio link set when certain conditions are met.

Example Discontinous Timing Patterns

Figure 2:
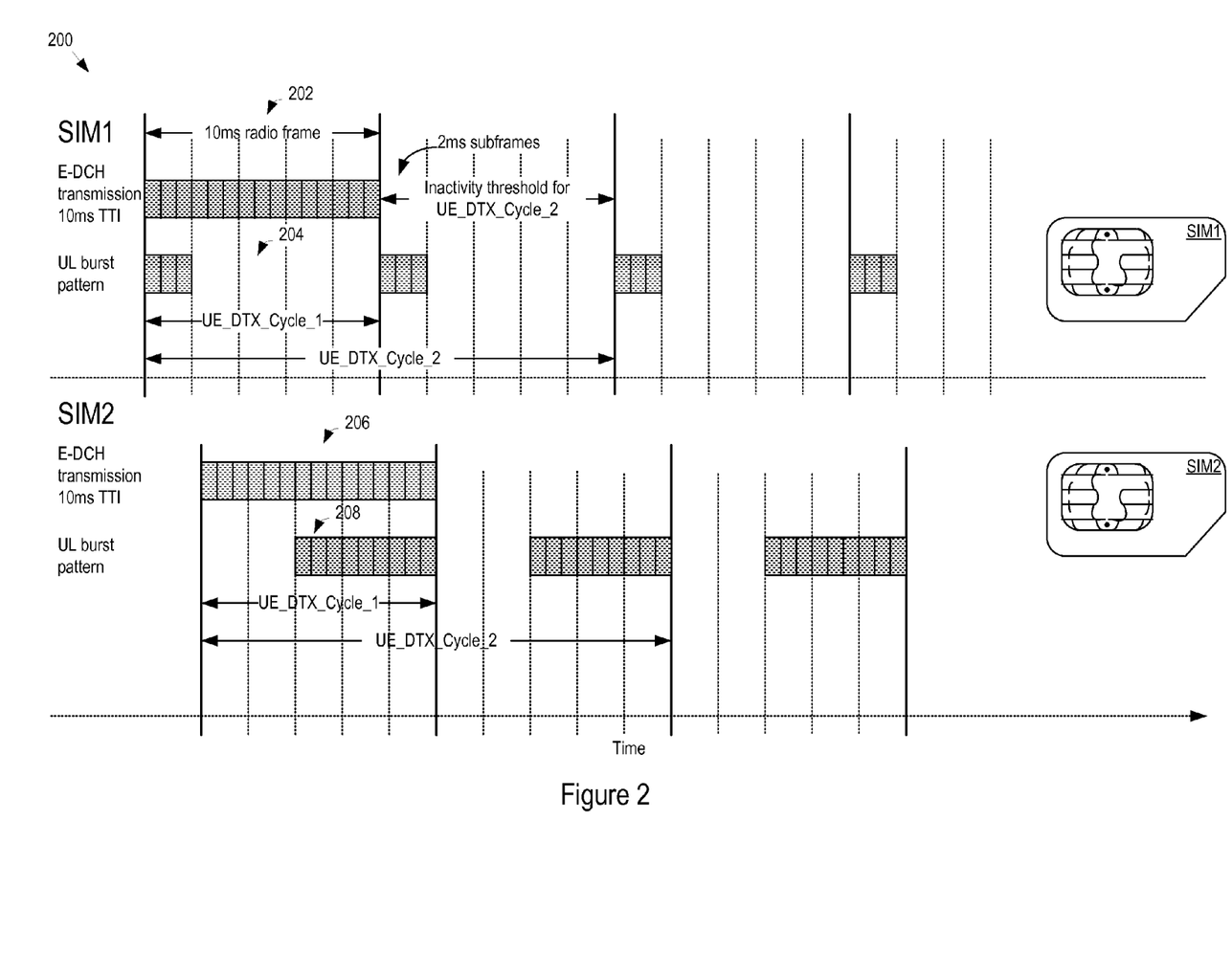
FIG. 2 shows a timing example of DTX scheduling.

FIG. 2 shows a timing example of DTX scheduling 200 for SIM1 102 and for SIM2 104. Each SIM may have different DTX and DRX patterns because each SIM may be connected to different networks that supply different timing parameters. For example, the SIM1 102 may receive its parameters from the Node B 128 and SIM2 104 may receive its parameters from the Node B 129. FIG. 2 shows a radio frame 202 which in this example is 10 ms long, and an example DTX uplink burst pattern 204 for SIM1 102. The uplink burst pattern 204 shows that SIM1 102 transmits discontinuously during the radio frame 202. In particular, in this example, the DTX parameters have established that SIM1 will only transmit during the first subframe in each radio frame 202. In other subframes, the SIM1 102 does not transmit and the user equipment 100 may enter a low power mode if the radio resource otherwise remains unused.

FIG. 2 also shows that SIM2 104 has its own DTX timing. In particular, SIM2 104 also has its own radio frame 206, and the timing need not be the same as the timing for SIM1 102. SIM2 also has its own uplink burst pattern 208. The uplink burst pattern 208 may be established by the timing parameters provided by the Node B 129, for example. Similar patterns exist for the DRX mode of operation, as will be described in more detail below.

Figure 3:
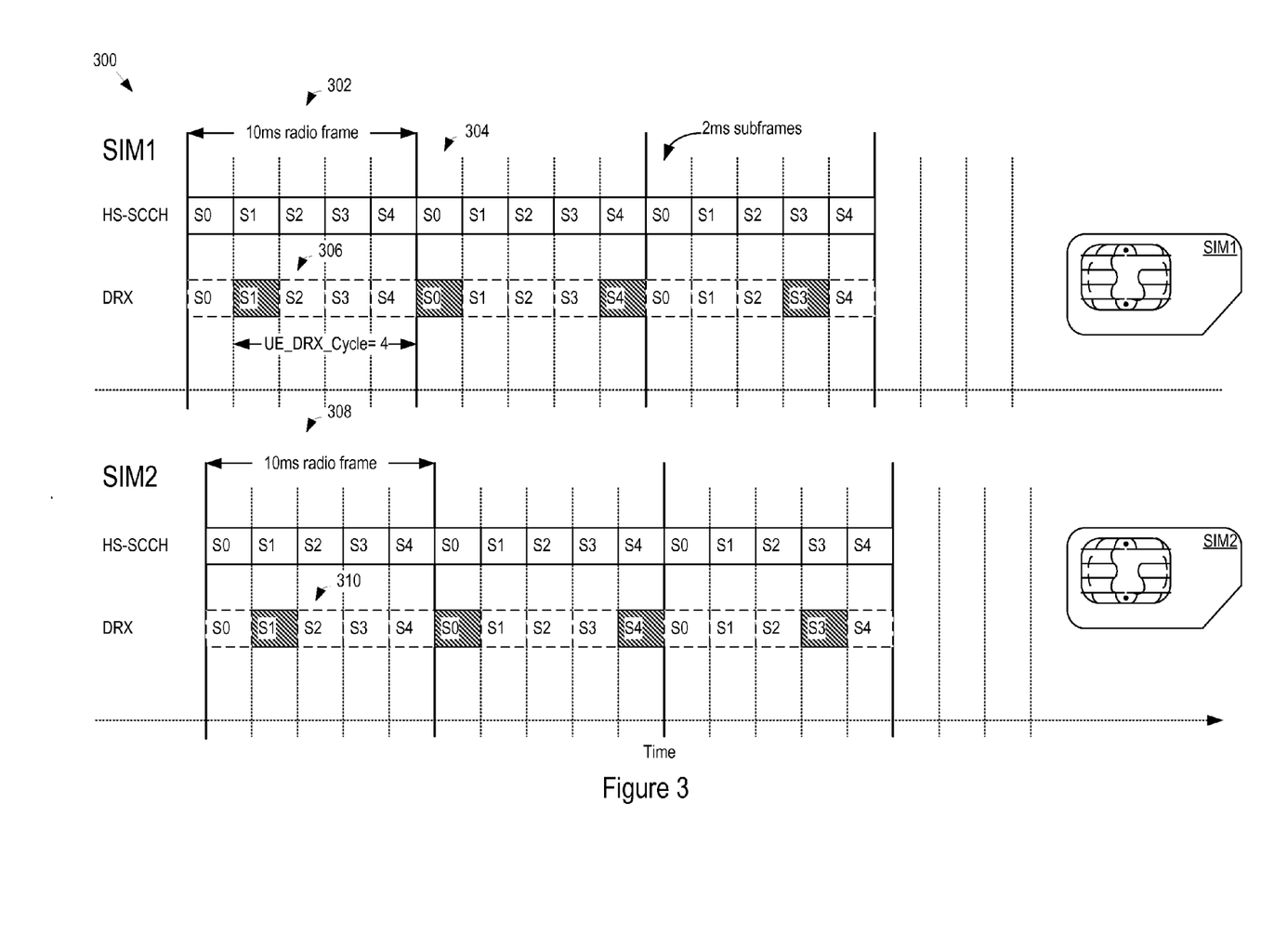
FIG. 3 shows a timing example of DRX scheduling.

Section 6C, titled Discontinuous transmission and reception procedures, in the 3GPP V9.5.0 Physical Layer Procedures (FDD) document explains the way in which the DRX/DTX parameters establish the DRX and DTX patterns. However, the techniques described in this document are not limited to any particular way of defining the DRX or DTX patterns based on the DRX and DTX parameters. Just as an example to help illustrate the DRX and DTX pattern determination, Table 2 summarizes how the DTX patterns are determined under Section 6C and Table 3 summarizes how the DRX patterns are determined under Section 6C for high speed shared control channels (HS-SCCH). Tables 2 and 3 also highlight one way in which the UE_DTX_DRX_Offset parameter shifts the DTX and DRX patterns by moving the first subframe in the uplink burst or the subframes that are received.

quency resources are used less efficiently than they might otherwise be used. FIG. 3 shows timing diagrams 300 for DRX scheduling. The timing diagrams 300 show the SIM1 radio frame 302, and the five subframe HS-SCCH channel 304 within the radio frame 302. The DRX parameters received from the Node B 128 have configured the radio access for SIM1 102 to provide a DRX pattern 306 through

TABLE 2

Summary of DTX pattern determination

The Uplink DPCCH burst pattern may define a minimum set of slots (e.g., subframes) in which the user equipment transmits (e.g., transmits a UL-DPCCH). The UL DPCCH burst pattern may be derived as follows:
1) With no E-DCH transmission for the last Inactivity_Threshold_for_UE_DTX_cycle_2 E-DCH TTIs, and at least this many TTIs have passed since the end of the Enabling_Delay, then:
1a) The transmission length in the Uplink DPCCH burst pattern is: UE_DPCCH_burst_2 subframes.
1b) The gap length following the DPCCH transmission burst in the Uplink DPCCH burst pattern is: (UE_DTX_cycle_2 − UE_DPCCH_burst_2) subframes,
1c) The first subframe in each Uplink DPCCH burst pattern shall be such that the CFN and DPCCH subframe number S satisfy:
((5*CFN − UE_DTX_DRX_Offset + S) MOD UE_DTX_cycle_2) = 0
2) Otherwise:
2a) The transmission length in the Uplink DPCCH burst pattern is: UE_DPCCH_burst_1 subframes.
2b) The gap length following the DPCCH transmission burst in the Uplink DPCCH burst pattern is: (UE_DTX_cycle_1 − UE_DPCCH_burst_1) subframes.
2c) The first subframe in each Uplink DPCCH burst pattern shall be such that the CFN and DPCCH subframe number S satisfy:
((5*CFN − UE_DTX_DRX_Offset + S) MOD UE_DTX_cycle_1) = 0

TABLE 3

Summary of DRX pattern determination

The HS-SCCH reception pattern may be derived from discontinuous reception subframe numbering using the following assumptions, where CFN is a reference to the Connection Frame Number and HS-PDSCH is a reference to the high speed physical downlink shared channel:
1) The discontinuous HS-SCCH reception subframe numbering is such that:
a) A HS-SCCH discontinuous reception radio frame is 10 ms long and is indexed using CFN_DRX.
b) The start of the HS-SCCH discontinuous reception radio frame of CFN_DRX n is aligned with the start of the HS-SCCH subframe that starts τDRX chips after the start of the associated downlink F-DPCH of Connection Frame Number (CFN) n.
c) The HS-SCCH subframe S_DRX=0 is aligned with the start of the HS-SCCH discontinuous reception radio frame. The HS-SCCH subframes are numbered S_DRX=0 to S_DRX=4.
d) The HS-PDSCH discontinuous reception radio frame of CFN_DRX n starts τHS-PDSCH chips after the start of the HS-SCCH discontinuous reception radio frame of CFN_DRX n. The HS-PDSCH subframe S_DRX=0 is aligned with the start of the HS-PDSCH discontinuous reception radio frame. The HS-PDSCH subframes are numbered S_DRX=0 to S_DRX=4.
e) The HS-DPCCH discontinuous transmission radio frame of CFN_DRX n starts at the HS-DPCCH subframe boundary closest in time to 1280 chips after the start of the HS-SCCH discontinuous reception radio frame of CFN_DRX n as received at the UE. The HS-DPCCH subframe S_DRX=0 is aligned with the start of the HS-DPCCH discontinuous transmission radio frame. The HS-DPCCH subframes are numbered S_DRX=0 to S_DRX=4.
2) The HS-SCCH reception pattern is the set of subframes whose HS-SCCH discontinuous reception radio frame number CFN_DRX and subframe number S_DRX satisfy:
((5*CFN_DRX − UE_DTX_DRX_Offset + S_DRX ) MOD UE_DRX cycle) = 0

Enhanced Discontinuous Mode Operation p In some implementations of the user equipment 100, the SIMs share radio frequency resources, including the transmit/receive paths in the communication interface 122. As a result, both SIMs cannot receive at the same time or transit at the same time. Instead, the user equipment 100 allows the SIMs to share the radio frequency resources in a time division manner.

Sharing the radio frequency resources, in combination with DTX/DRX, can lead to situations in which the radio frewhich the SIM1 102 receives every fourth subframe of the HS-SCCH channel 304. In other words, UE_DRX_Cycle=4. In this example, SIM1 102 only needs to be active on the radio resources to receive one out of every four HS-SCCH frames.

Similarly, SIM2 104 operates with a 10 ms radio frame 308, which is not typically synchronized in time with the SIM1 radio frame 302. The DRX parameters received from the Node B 129 have also configured the SIM2 104 to receive every fourth subframe of the HS-SCCH channel for the network that SIM2 104 is on. SIM2 thus has the DRX pattern 310.

Figure 4:
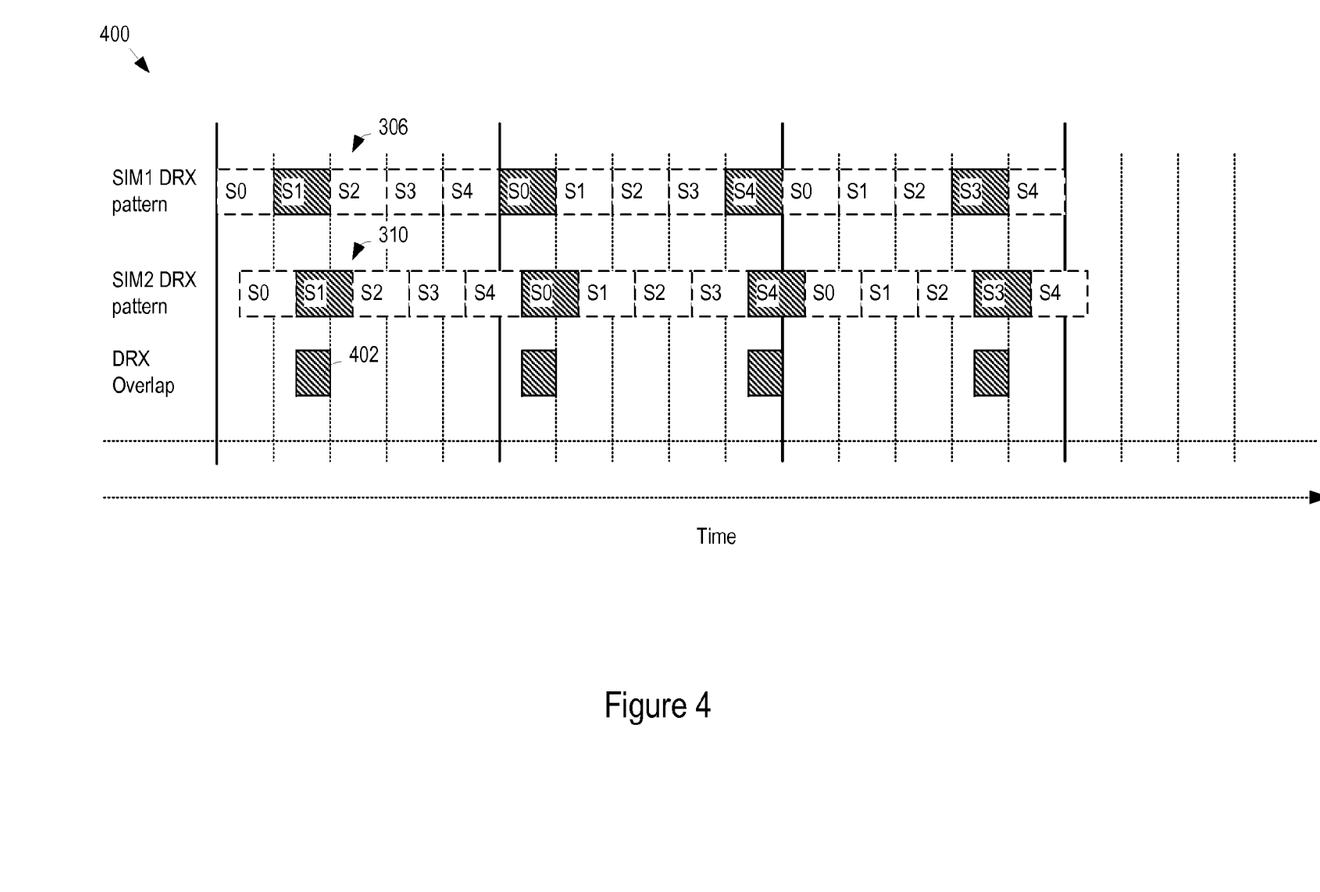
FIG. 4 is an example of a timing diagram that shows the overlap in the SIM1 DRX pattern and the SIM2 DRX pattern.

FIG. 4 is a timing diagram 400 that shows the overlap in the SIM1 DRX pattern 306 and the SIM2 DRX pattern 310. In particular due to the timing similarities in the SIM1 DRX pattern 306 and the SIM2 DRX pattern 310, each pattern has substantial overlap. One specific example is the timing overlap 402, which is about 60% overlap between SIM1 102 and SIM2 104. The timing overlap 402 repeats regularly, each time both SIM1 102 and SIM2 104 are configured to be active and receiving on the radio resource.

The time sharing of the radio frequency resources support multiple SIM operation in the user equipment 100. However, this time sharing can cause inefficiencies in responding to wake-up paging signals and in general receiving data while connected. This is particularly true when the multiple SIMs have significant overlap in reception timing, as shown in the examples in FIGS. 3 and 4. More specifically, the discontinuous reception parameters have established that both SIMs are supposed to be receiving at the same time (i.e., during the overlap 402), but cannot do so because the radio resources are shared and only permit access one SIM at a time. As a result, when there is overlap, one SIM cannot receive pages (e.g., in the HS-SCCH) or data because the other SIM is active instead.

To enhance the discontinuous modes of operation, the system logic 114 determines the amount of overlap in DRX or DTX cycles between SIM1 and SIM2 (and optionally additional SIMs if present in the user equipment 100) and attempts to shift the DRX pattern, DTX pattern, or both to enhance the discontinuous mode of operation. In one implementation, the scheduling instructions 122 determine whether the DRX or DTX patterns meet predetermined efficiency criteria 130.

Examples of efficiency criteria include: whether there is DRX or DTX overlap, whether overlap is less than a threshold percentage (e.g., 10%) of overlap, whether fewer than 'n' subframes overlap in any amount out of every 'r' subframes, or whether at least some number of subframe, chip, timing or other gap exists between DRX or DTX accesses for different SIMs. When the efficiency criteria 130 is not met, for example when the amount of overlap exceeds an overlap threshold, the system logic 114 may then attempt to shift the DRX pattern, DTX pattern, or both (when they may be shifted independently under a given communication standard), to satisfy the efficiency criteria 130 for the discontinuous mode of operation.

Shifting the DRX/DTX patterns may include negotiating various parameters with the network controllers (e.g., the Node B 128 and Node B 129) for any of the SIMs in the user equipment 100. For example, the scheduling instructions 122 may negotiate the UE_DTX_DRX Offset parameter with the Node B 128 to reach the enhancement goal of reducing DRX overlap between SIM1 102 and SIM2 104 to less than a predetermined percentage. The negotiation may include, as one example, the scheduling instructions 122 communicating a desired UE_DTX_DRX Offset for SIM1 102 or for SIM2 104 to the Node B 128, and receiving acknowledgement from the Node B 128 that the UE_DTX_DRX Offset is accepted and may be used going forward. The negotiation may additionally or alternatively include, as another example, the scheduling instructions 122 forcing a connection (e.g., a phone call or data connection) currently handled by SIM1 102 or SIM2 104 to drop, even though there are no particular quality or performance issues with the connection itself. As a result, when the Node B 128 re-establishes the call, the Node B 128 may specify a different UE_DTX_DRX Offset parameter that results in more efficient discontinuous mode operation. The user equipment 100 may force the connection to drop as often as desired in order to obtain a more suitable UE_DTX_DRX Offset parameter.

A third way to negotiate the DRX/DTX operation involves the network messages that carry discontinuous mode parameters or that otherwise specify discontinuous mode configuration. In particular, the scheduling instructions 122 may analyze the discontinuous mode parameters to determine whether the resulting DRX/DTX patterns meet the efficiency criteria 130. If the DRX/DTX patterns do not meet the efficiency criteria 130, then the scheduling instructions 122 may send (e.g, through a RRC layer message) a status message to the Node B 128 that indicates Configuration Failure. In other words, the user equipment 100 may inform the Node B 128 that the user equipment 100 cannot set the discontinuous mode parameters provided by the Node B 128. The status message may also include a Failure Cause, for example, that the suggested discontinuous mode parameters would result in inefficient operation. The Node B 128 may respond to such a message by providing different discontinuous operational mode parameters, asking the user equipment 100 to send suggested discontinuous mode parameters to the Node B 128, or in other ways. One benefit of the Configuration Failed status message approach is that is does not force a call to drop.

In other implementations, the scheduling instructions 122 may negotiate other DTX/DRX parameters individually or in combination in an effort to enhance discontinuous mode operation and reach the enhancement goal. As examples, the scheduling instructions 122 may attempt to negotiate the UE DTX cycle 1, UE DTX cycle 2, UE DPCCH burst_1, or UE DPCCH burst_2 parameters for SIM1 102 or SIM2 104 individually or in combination (along with UE_DTX_DRX Offset).

Figure 5:
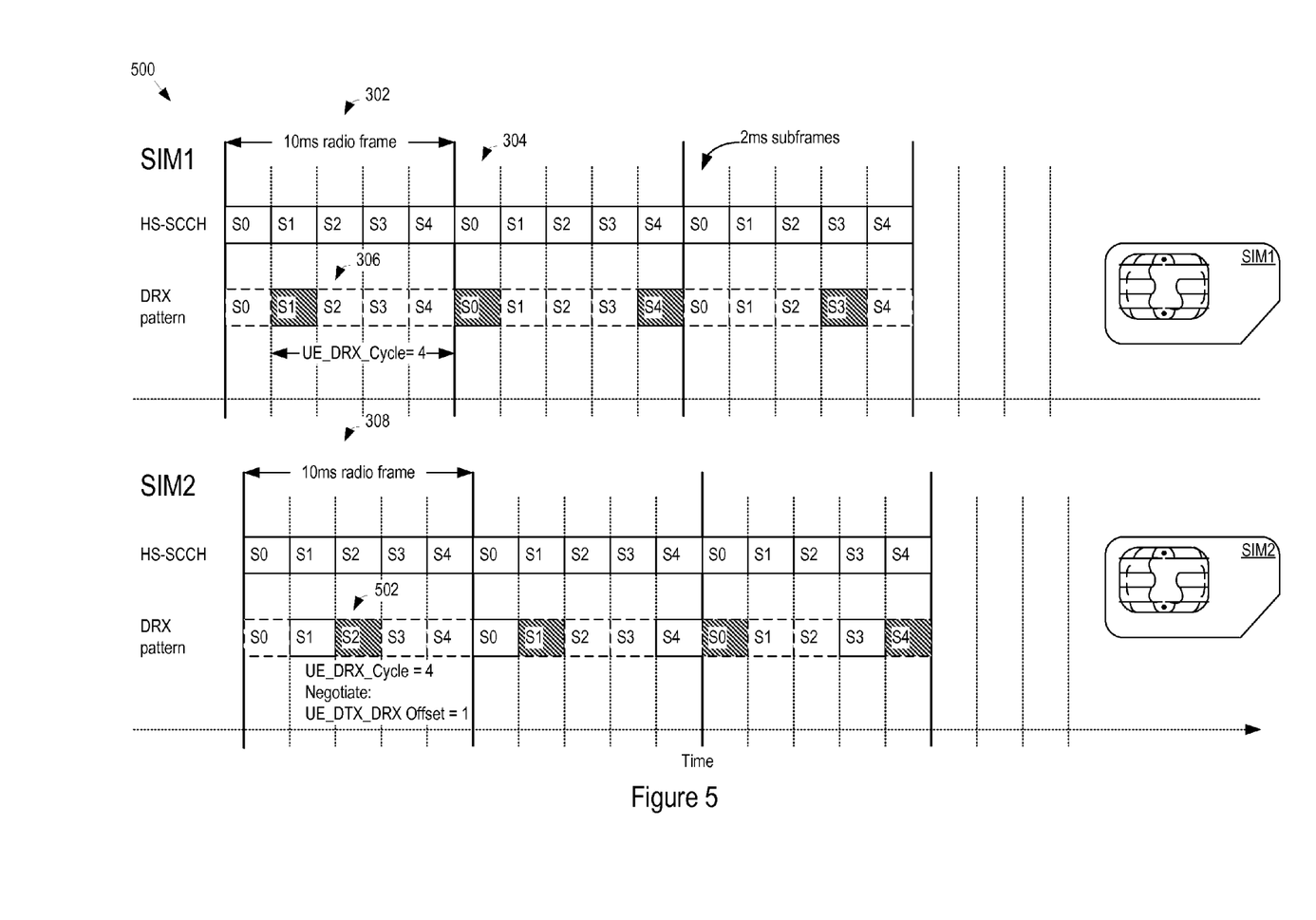
FIG. 5 is an example timing diagram that shows the effect of the user equipment negotiating a change the DRX parameters.

FIG. 5 is an example timing diagram 500 that shows the effect of the user equipment 100 negotiating a change the DRX parameters. In this example, the scheduling instructions 122 have caused the user equipment 100 to communicate with the Node B 129 responsible for SIM2's network. The scheduling instructions have issued, for example, a parameter change request message to the Node B 129, requesting that UE_DTX_DRX_Offset for SIM2 104 be set to a value of 1. This causes the shift by one slot in the SIM2 DRX reception to obtain the new SIM2 DRX reception pattern 502.

Figure 6:
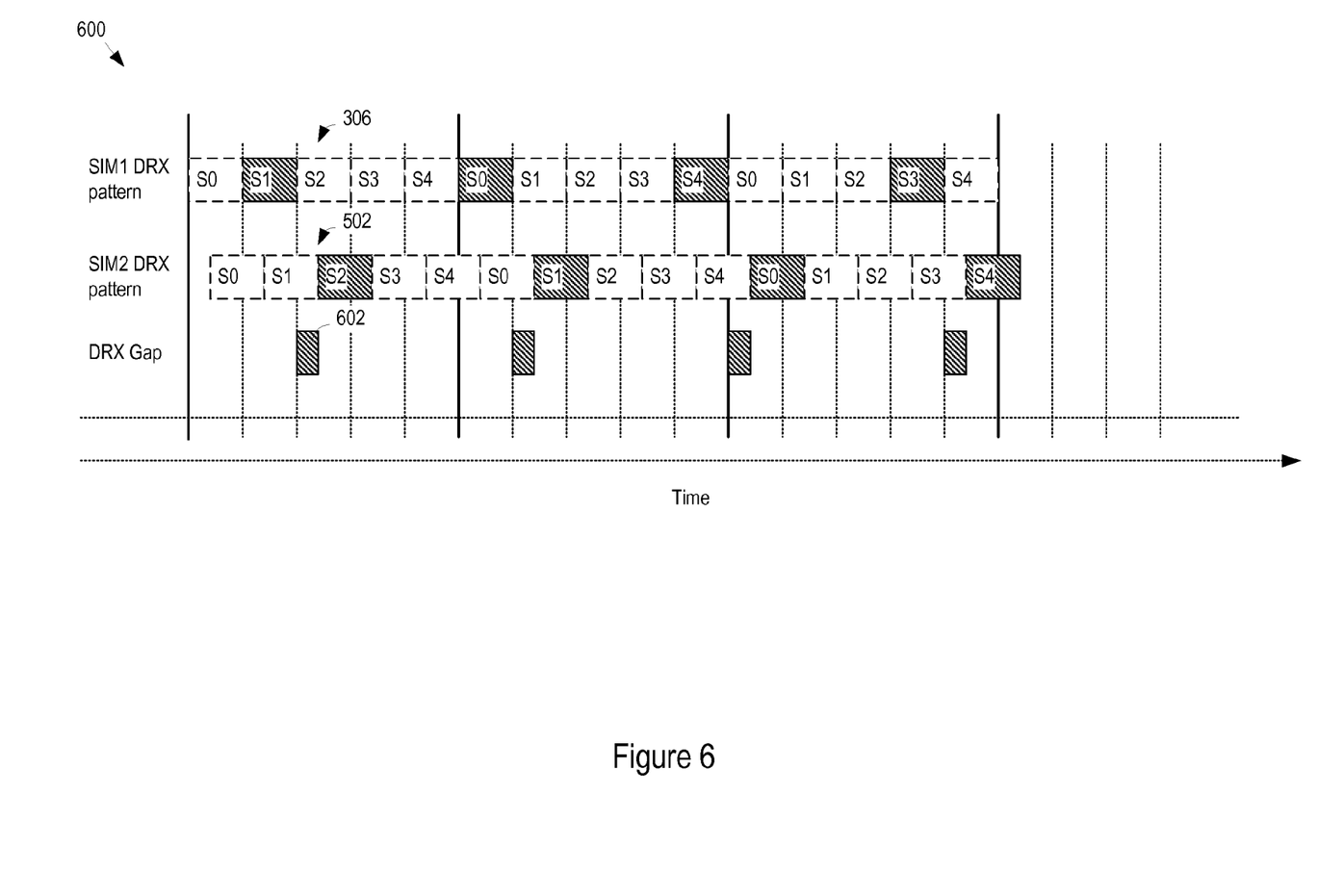
FIG. 6 shows a timing diagram showing the result of the shift in the SIM2 DRX pattern.

FIG. 6 shows a timing diagram 600 showing the result of the shift in the SIM2 DRX pattern. Instead of DRX overlap, there is now a DRX gap 602. The DRX gap 602 may, for example, provide sufficient time for the user equipment 100 to switch radio access between SIM1 102 and SIM2 104 so that both SIMs can receive using the shared radio resources. As a result, both SIM1 102 and SIM2 104 have enhanced ability to receive pages, data, and other communications. Note that the DRX patters may be shifted by more than one slot, any may be reconfigured in many different ways. For example, if the DRX gap 602 does not provide sufficient time to allow the radio resource to switch to SIM2, then the user equipment 100 may instead try to negotiate a DRX offset that increases the DRX gap 602 to any degree needed to allow SIM2 to access the radio resource (and to satisfy the efficiency criteria 130).

Figure 7:
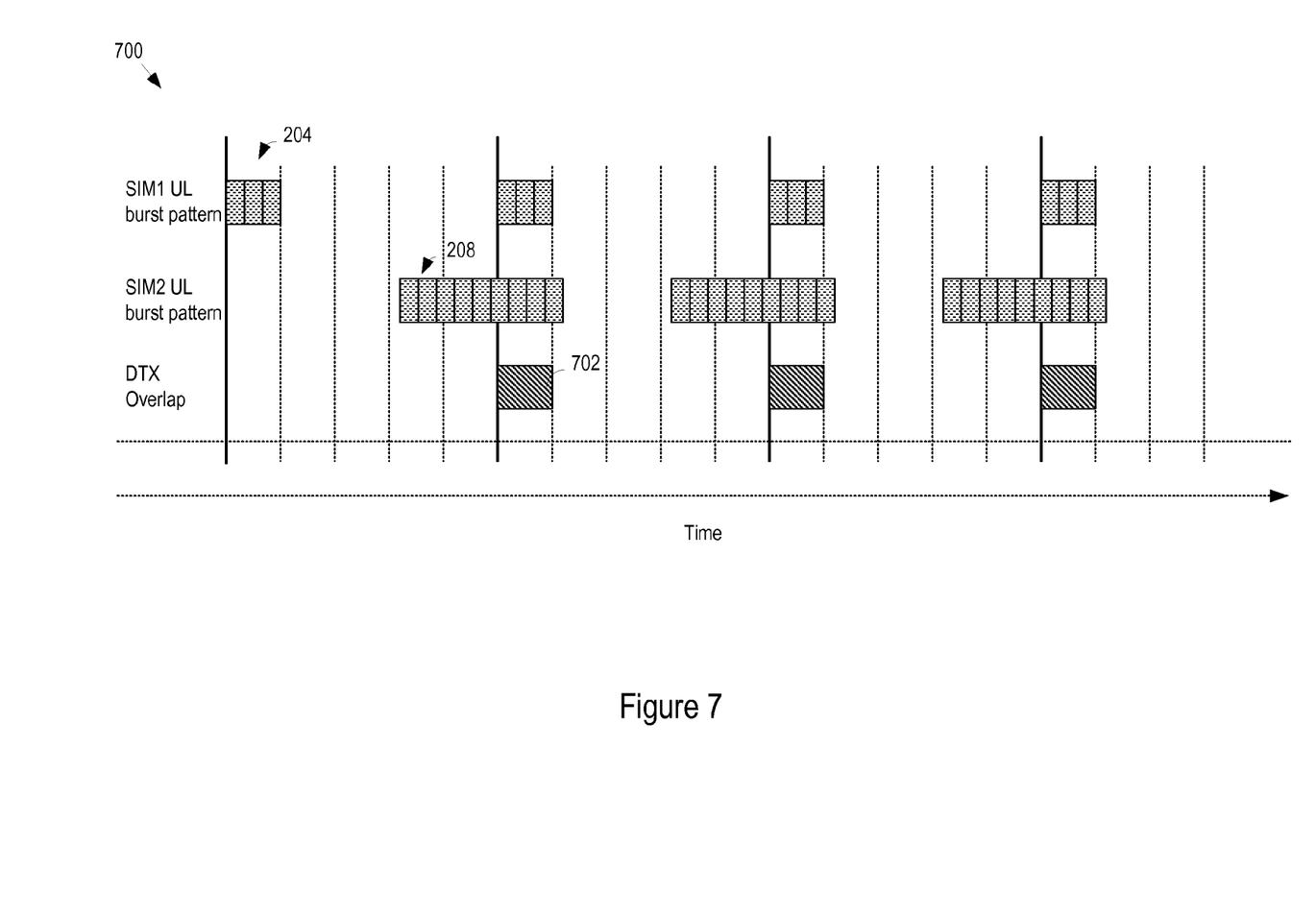
FIG. 7 shows an example timing diagram 700 that continues the example shown in FIG. 2.

Similar inefficiencies may arise if the DTX patterns for SIM1 102 and SIM2 104 overlap, and the system logic 114 may similarly request or negotiate changes to the DRX/DTX parameters to reach any desired efficiency criteria because of DTX pattern overlap. FIG. 7 shows an example timing diagram 700 that continues the example shown in FIG. 2. In particular, FIG. 7 shows the DTX overlap 702 between the SIM1 DTX pattern 204 and the SIM2 DTX pattern 208. The entirety, 100%, of the SIM1 DTX pattern 204 overlaps with the SIM2 DTX pattern 208. Conversely, about 33% of the SIM2 DTX pattern 208 conflicts with the SIM1 DTX pattern 204. In this scenario, SIM1 102 cannot transmit at all, if SIM2 104 has the radio access, and SIM2 104 cannot use its full DTX allocation if the user equipment 100 will allow SIM1 102 to access the radio resource with SIM2 104.

Figure 8:
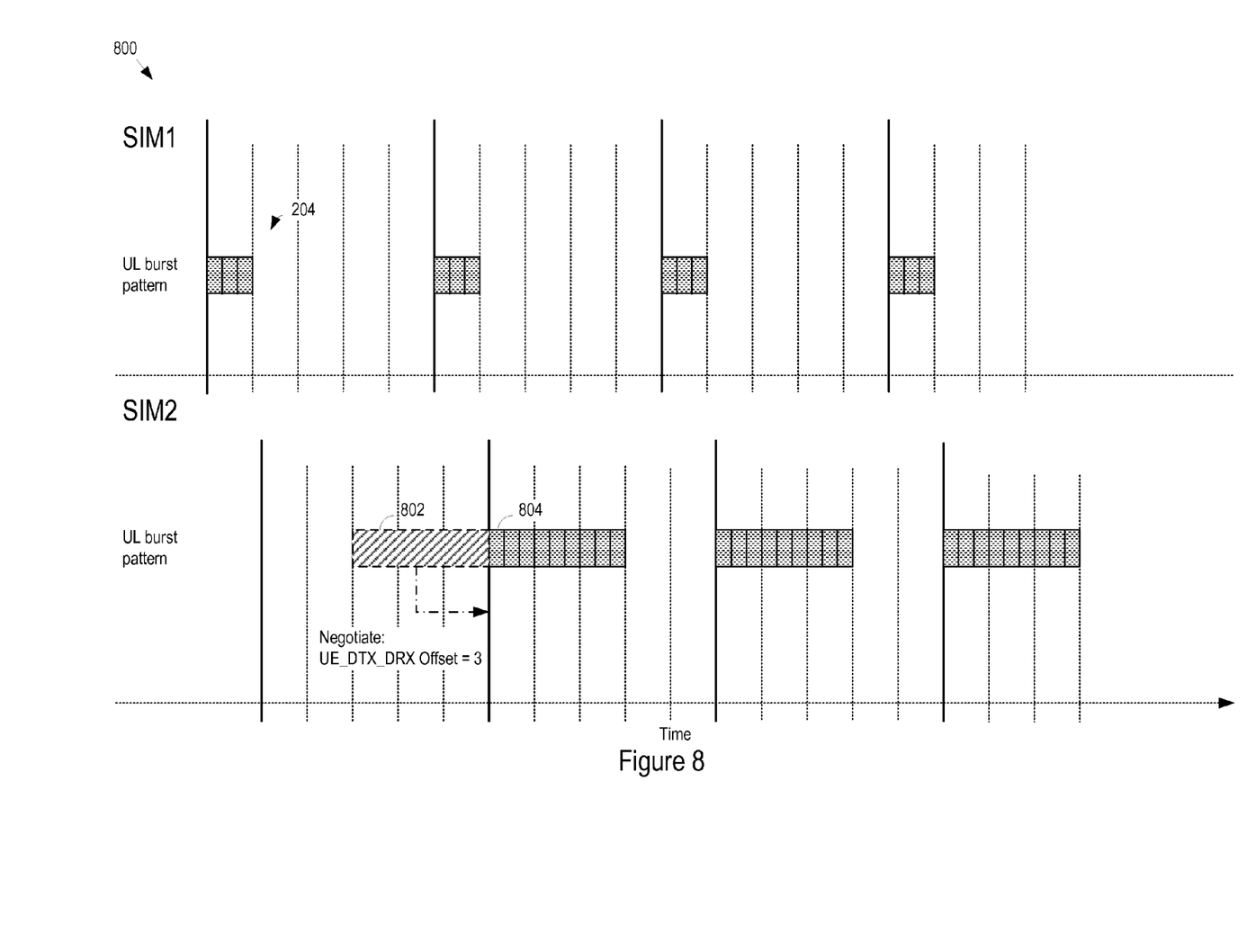
FIG. 8 shows a timing diagram in which the user equipment has negotiated with the Node B to shift the SIM2 DTX pattern ahead three subframes.

FIG. 8 shows a timing diagram 800 in which the user equipment 100 has negotiated with the Node B 129 to shift the SIM2 DTX pattern ahead three subframes, e.g., UE_DTX_DRX_Offset=3. The SIM2 DTX burst previously had the pattern 802, but has been shifted to pattern 804. As a result, the DTX overlap 702 has been eliminated, and each SIM may transmit uninterrupted by the other.

Figure 9:
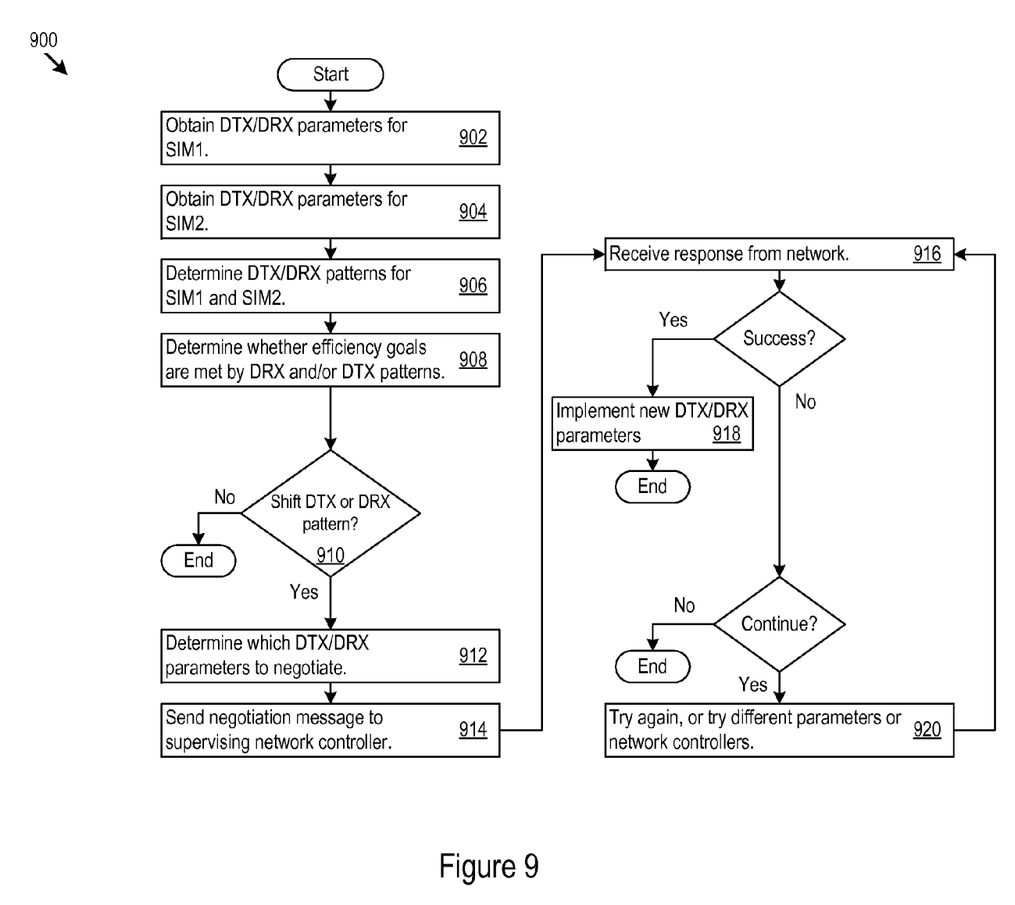
FIG. 9 shows discontinuous mode enhancement logic (DMEL).

FIG. 9 shows discontinuous mode enhancement logic (DMEL) 900. The system logic 114, scheduling instructions 122, or other parts of the user equipment 100 may implement the enhancement logic 900. The DMEL 900 obtains the DTX/DRX parameters for SIM1 (902) and for SIM2 (904). The DMEL 900 may then determine the DTX pattern, DRX pattern, or both for SIM1 102 and SIM2 104 (906). Given the DRX/DTX patterns, the DMEL 900 determines whether the DRX/DTX patterns meet the efficiency goal defined in the user equipment 100 (908). For example, the DMEL 900 may determine whether there is any overlap in the DRX patterns or in the DTX patterns.

If the DMEL 900 determines for any reason to shift the DTX/DRX patterns (910), then the DMEL 900 determines which DTX/DRX parameters to negotiate (912). There may be many such parameters operating together, as described above for example, that determine the DTX/DRX patterns. As one example, the DMEL 900 may determine a new value for UE_DTX_DRX_Offset that avoids overlap in the DRX pattern, the DTX pattern, or both.

The DMEL 900 communicates a negotiation message to the supervising network controller (e.g., to the Node B 128 or 129) that specifies the desired DTX/DRX parameters. The DMEL 900 receives a response from the network (916). If the negotiation was successful then the DMEL 900 may set and implement the new DTX/DRX parameters (918). Or, if no further attempts are desired, then the process may end. Otherwise, the DMEL may try again, try different parameters, or different network controllers (920). For example, rather than shifting the DRX pattern for SIM2 through negotiation with the Node B 129, the DMEL 900 may instead try to shift the DRX pattern for SIM1 through negotiation with the Node B 128. Furthermore, the DMEL 900 may receive (e.g., in the response from the network) suggestions for parameter values or combinations of parameter values that the network can implement. The DMEL 900 may choose among the suggested parameters values and respond to the network controller with its selection.

Figure 10:
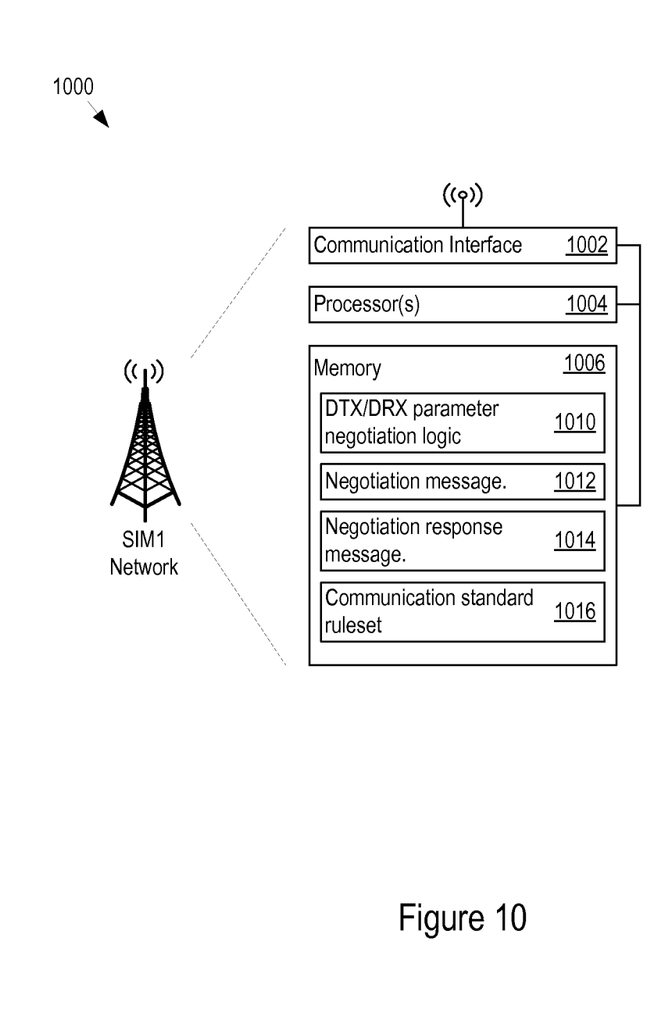
FIG. 10 shows an example of a network controller 1000 that supports DTX/DRX negotiation.

FIG. 10 shows an example of a network controller 1000 (e.g., the Node B 128) that supports DTX/DRX negotiation. The network controller 1000 includes a communication interface 1002, processors 1004, and a memory 1006. The hardware and software in the network controller 1000 may be implemented as a UMTS Node B, GSM base station, or other type of network controller.

The network controller 1000 is extended to include logic for handing DTX/DRX negotiation with user equipment. For example, the network controller 1000 may include DTX/DRX parameter negotiation logic 1010. The network controller 1000 may also operate with respect to a particular set of communication standard rulesets 1016, which may be extended to include DTX/DRX parameter negotiation. For example, in addition to communicating the UE_DTX_DRX_Offset to the user equipment, the network controller 1000 may also receive negotiation messages 1012 from user equipment, determine whether the requested DRX/DTX parameters in the negotiation messages 1012 are permissible in view of the rulesets 1016, and prepare and respond to the user equipment with negotiation response messages 1014.

Figure 11:
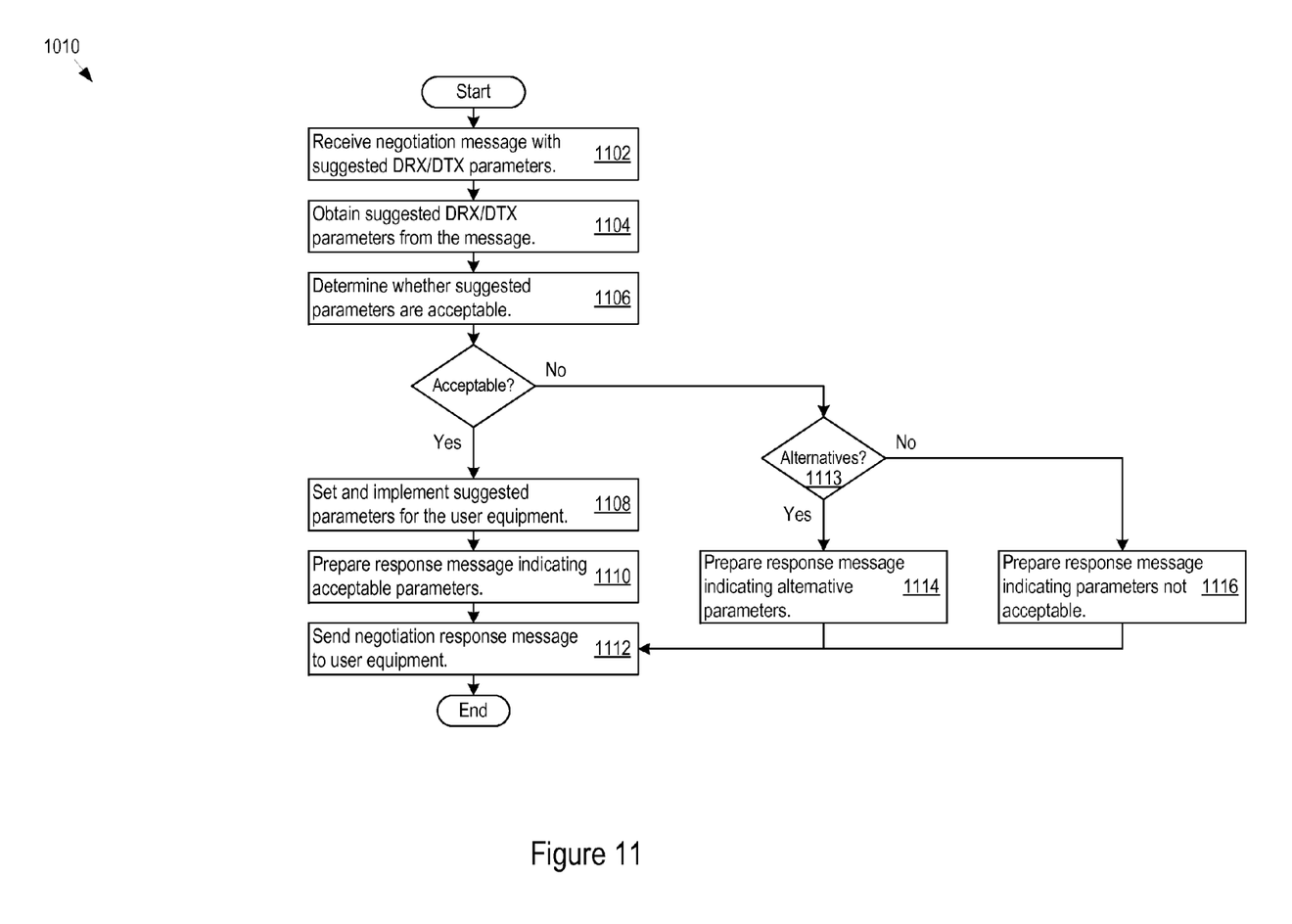
FIG. 11 shows an example of the DTX/DRX parameter negotiation logic (PNL) that may be implemented at the network controller.

FIG. 11 shows an example of the DTX/DRX parameter negotiation logic (PNL) 1010 that may be implemented at the network controller 1000. The PRL 1010 receives a negotiation message from the user equipment that contains suggested DRX/DTX parameters, such as a suggested new value for UE_DTX_DRX_Offset for a particular user equipment SIM (1102). The PNL 1010 obtains the suggested parameters from the message (1104). The PNL 1010 determines whether the suggested parameters are acceptable (1106). For example, the PNL 1010 may determine whether the suggested parameters meet the criteria set forth in the communication standard ruleset 1016, and will be acceptable for (e.g., not cause interference with) ongoing communications with other user equipment served by the network controller 1000.

If the suggested parameters are acceptable, then the PNL 1010 may set and implement the suggested parameters for the user equipment SIM (1108). The PNL 1010 prepares a negotiation response message indicating that the parameters were acceptable (1110) and sends the negotiation response message back to the user equipment that originated the negotiation message (1112).

If the suggested parameters are not acceptable, then the PNL 1010 may determine if there are DRX/DTX parameter alternatives that it can support for the user equipment and the SIM (1113). If so, the PNL 1010 may prepare the response message and specify the alternate DRX/DTX parameters (1114). If there no alternate options, then the PNL 1010 may prepare a response message indicating that the suggest parameters are not acceptable and that there are no alternatives available (1116).

The techniques described above are not limited to any particular communication standard, DRX/DTX parameters, control or communication channels, frame structures, or slot structures. Instead, the techniques described above are applicable to any shift of DTX/DRX patterns to achieve any desired efficiency goal in a communication system.

The methods, devices, techniques, and logic described above may be implemented in many different ways in many different combinations of hardware, software or firmware or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
scheduling, using scheduling logic, a first subscriber identity module (SIM) discontinuous mode pattern;
sending, via a communication interface, scheduling instructions for the first SIM discontinuous mode pattern;
receiving a network message indicating that the first SIM discontinuous mode pattern and a second SIM discontinuous mode pattern conflict; and
scheduling a change to the first SIM discontinuous mode pattern responsive to the message.

2. The method of claim 1, where the receiving the network message comprises receiving a parameter of the second SIM discontinuous mode pattern.

3. The method of claim 2, where the receiving the parameter of the second SIM discontinuous mode pattern comprises receiving a schedule of the second SIM discontinuous mode pattern.

4. The method of claim 1, where the scheduling the change to the first SIM discontinuous mode pattern comprises reducing an overlap between the first and second SIM discontinuous mode patterns.

5. The method of claim 4, where the reducing the overlap causes the first and second SIM to meet an efficiency criterion.

6. The method of claim 4, where the reducing the overlap causes the overlap to be less than a predetermined percentage of the first SIM discontinuous mode pattern.

7. The method of claim 1, where the scheduling the first SIM discontinuous mode pattern comprises scheduling a SIM discontinuous receive (DRX) pattern.

8. The method of claim 1, where the scheduling the first SIM discontinuous mode pattern comprises scheduling a SIM discontinuous transmit (DTX) pattern.

9. The method of claim 1, further comprising receiving a suggested value for the change to the first SIM discontinuous mode pattern.

10. The method of claim 9, further comprising accepting the suggested value for the change.

11. An apparatus comprising:
a radio frequency (RF) interface; and
system logic, in communication with the RF interface, the system logic configured to:
receive, from a user equipment, a negotiation message with a suggested change to a first subscriber identity module (SIM) discontinuous mode pattern, the suggested change being responsive to an overlap with a second SIM discontinuous mode pattern;
obtain the suggested change from the negotiation message;
determine whether the suggested change is acceptable; and
prepare a negotiation response message responsive to the determination.

12. The apparatus of claim 11, where the negotiation response message comprises an indication that the suggested change is acceptable.

13. The apparatus of claim 11, where the negotiation response message comprises an indication that the suggested change is unacceptable.

14. The apparatus of claim 11, where the negotiation response message comprises an indication of an alternative change.

15. The apparatus of claim 14, where the alternative change comprises a third discontinuous mode pattern; and
the second and third discontinuous mode patterns meet an efficiency criterion.

16. The apparatus of claim 15, where the efficiency criterion comprises a percentage overlap.

17. The apparatus of claim 11, where the suggested change comprises a shift by a number of subframes specified by a pattern offset parameter.

18. An apparatus comprising:
a radio frequency (RF) communication interface;
scheduling logic in communication with the RF communication interface, the scheduling logic configured to:
schedule a first discontinuous mode pattern for a first subscriber identity module (SIM);
generate a scheduling message comprising scheduling instructions for the first discontinuous mode pattern;
send, via the RF communication interface, the scheduling message;
responsive to the scheduling message, receive a negotiation message comprising an indicator that the first discontinuous mode pattern has a conflict; and
determine if a change to the first discontinuous mode pattern is acceptable.

19. The apparatus of claim 18, where the change comprises a suggested change from a user equipment on which the first SIM is disposed; and
the negotiation message further comprises the suggested change.

20. The apparatus of claim 18, where a second change to a second discontinuous mode pattern is configured to allow for the change to the first discontinuous mode to overcome the conflict.

* * * * *